July 31, 1945. W. L. HAND 2,380,839
CONTROL DEVICE FOR HEAT EXCHANGE SYSTEMS
Filed June 16, 1944 4 Sheets-Sheet 2
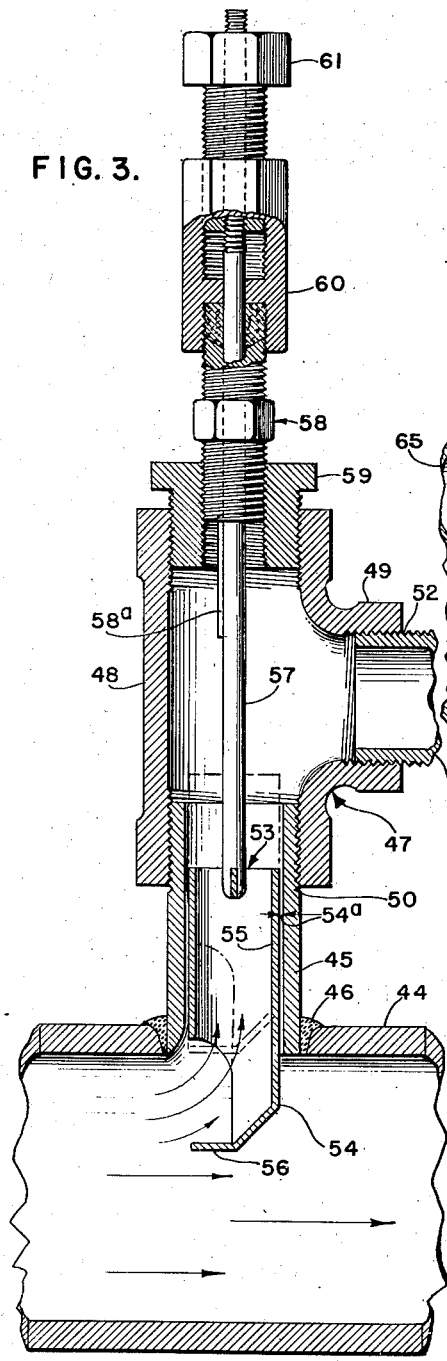
FIG. 3.
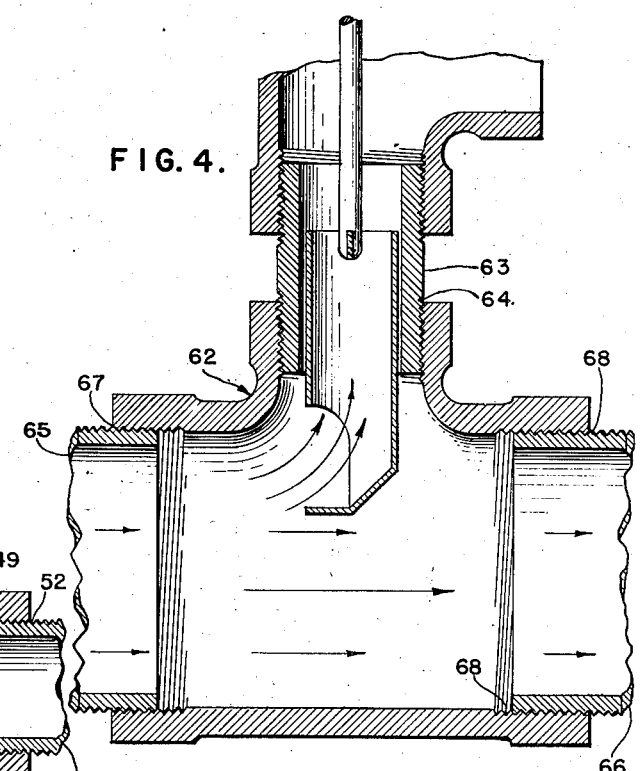
FIG. 4.
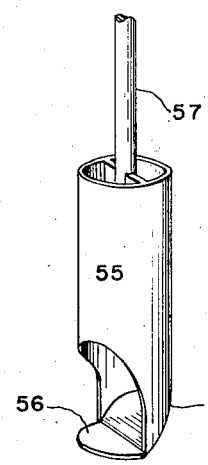
FIG. 4ᵃ.
INVENTOR:
WILLIAM L. HAND,
BY
ATTORNEY

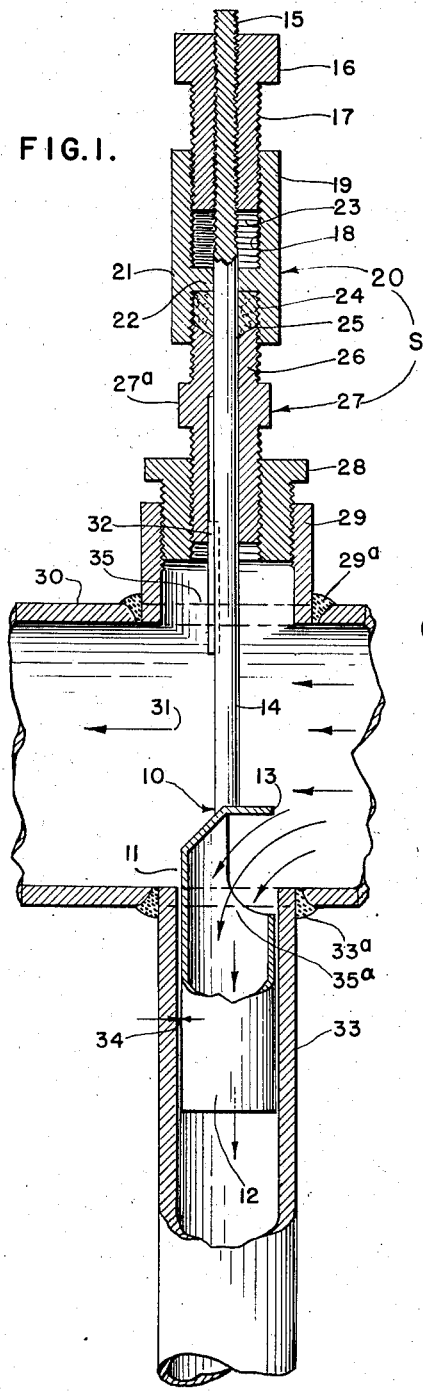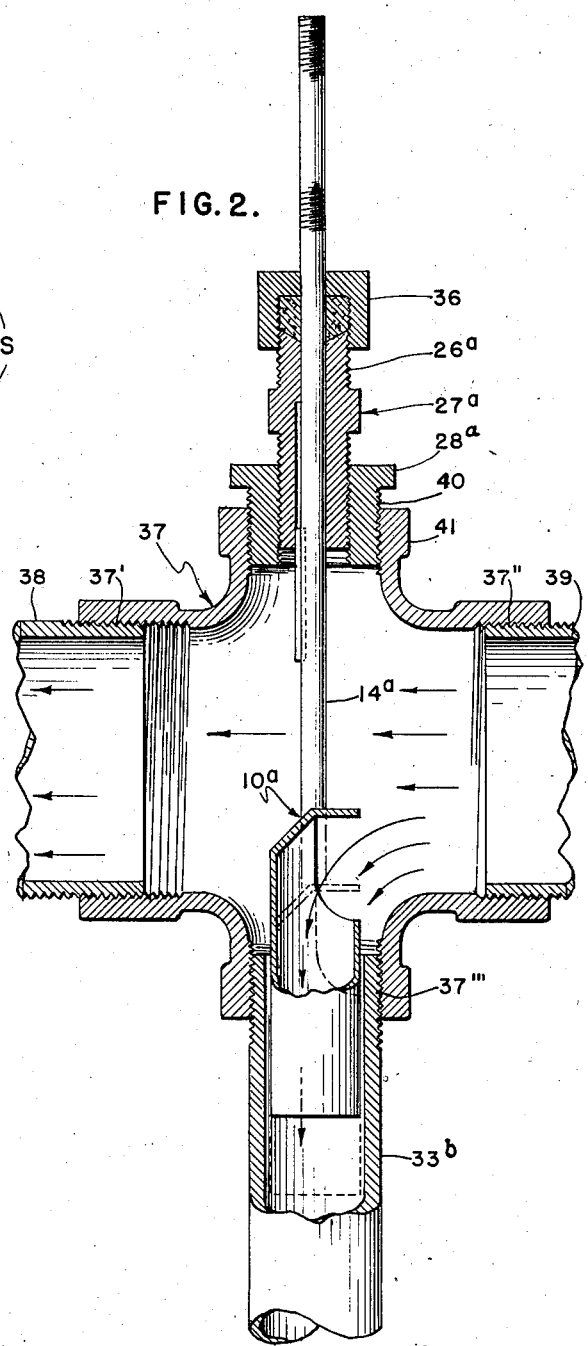

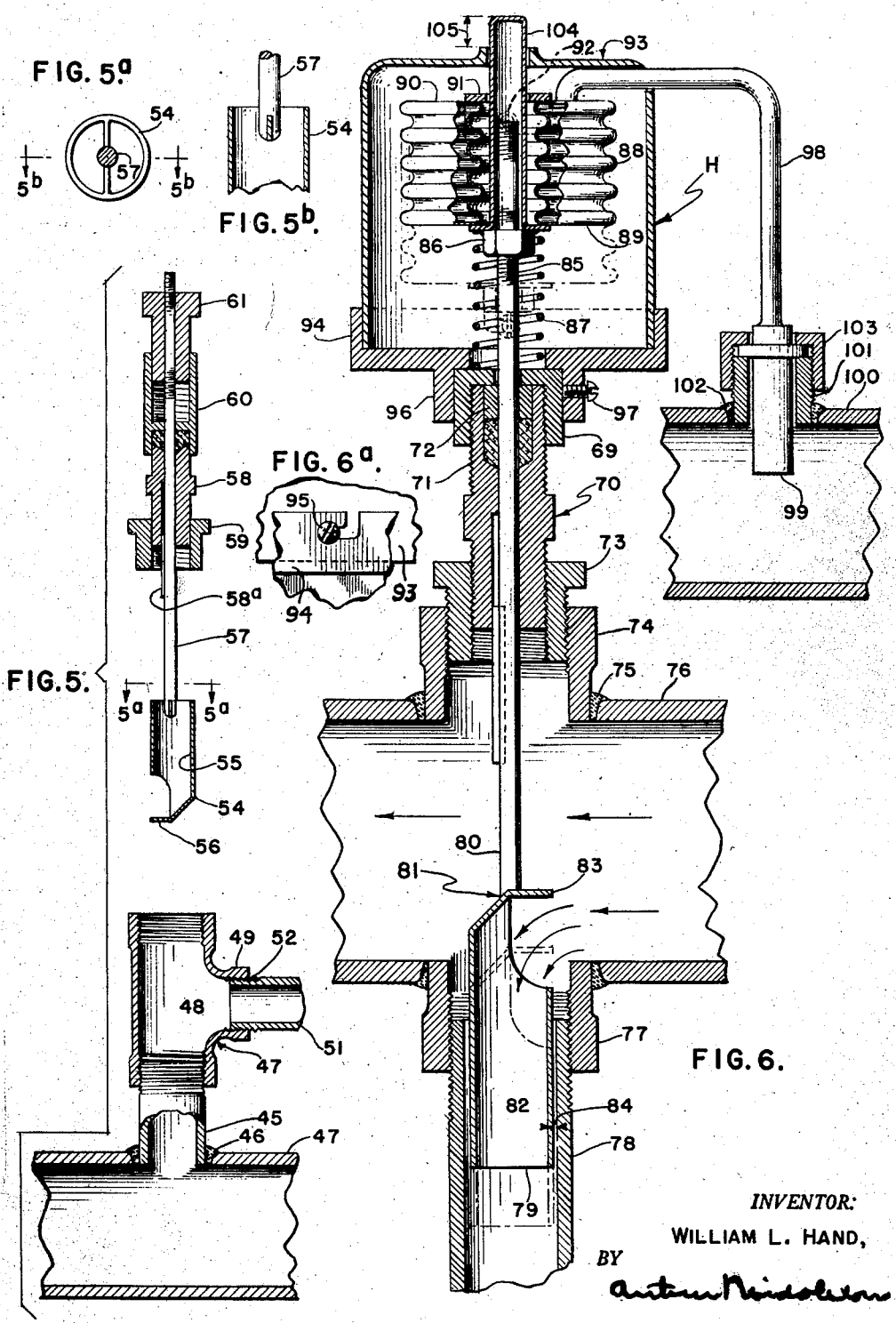

July 31, 1945.  W. L. HAND  2,380,839
CONTROL DEVICE FOR HEAT EXCHANGE SYSTEMS
Filed June 16, 1944  4 Sheets-Sheet 4
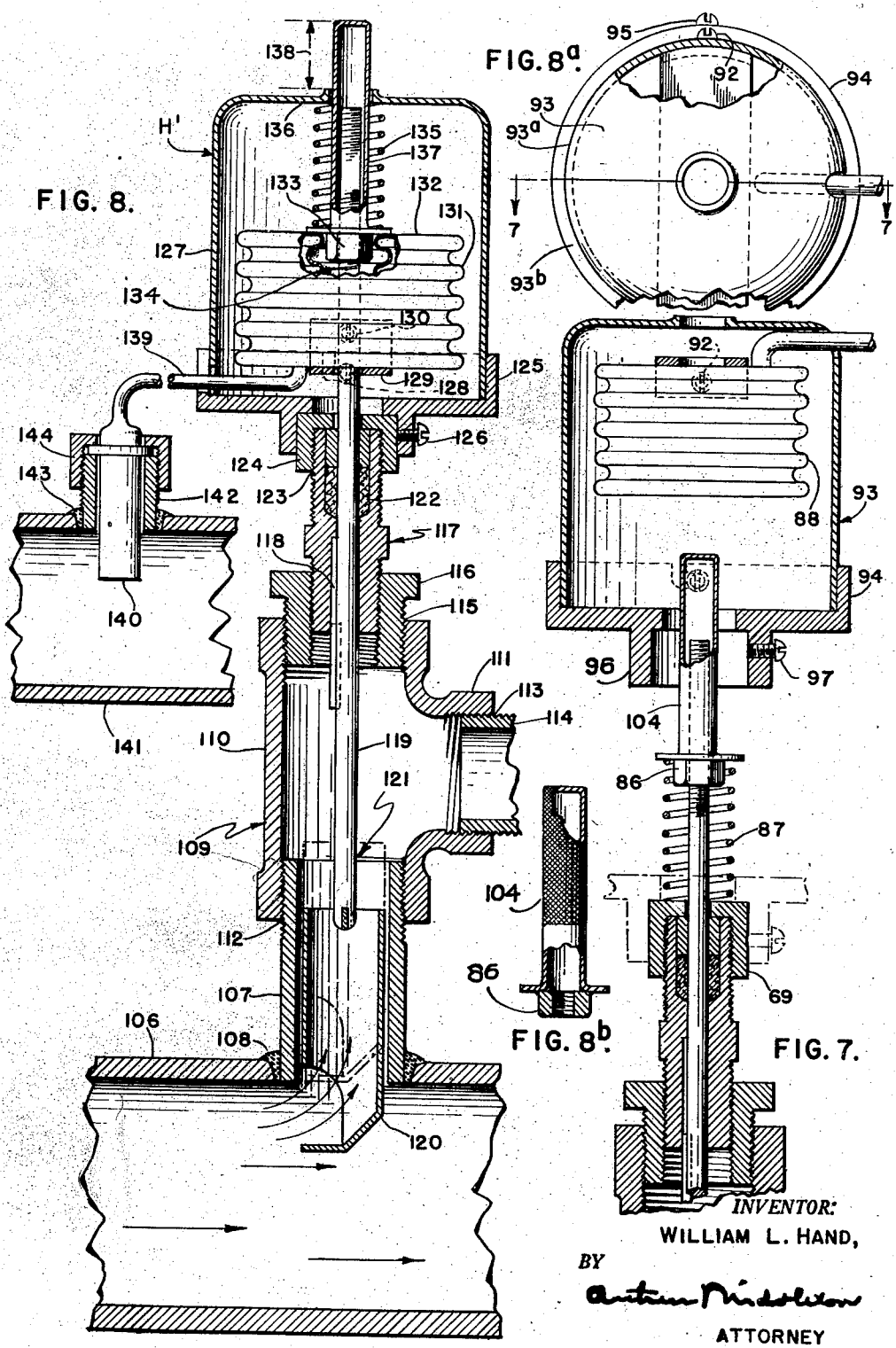
INVENTOR:
WILLIAM L. HAND,
BY
ATTORNEY Patented July 31, 1945

2,380,839

UNITED STATES PATENT OFFICE 2,380,839

CONTROL DEVICE FOR HEAT EXCHANGE SYSTEMS

William Louis Hand, Chicago, Ill.

Application June 16, 1944, Serial No. 540,707

7 Claims. (Cl. 138—37)

This invention relates to flow control devices for fluid heat exchange systems. Such devices are for the purpose of balancing the operation of the system so that each section, branch, or unit of the system should take its proportionate share in the heat transfer. Since the proper distribution can be judged in terms of temperature, such devices can also be said to control temperature conditions in the branches of the system. While this includes heating as well as cooling systems, the invention will be described, although in no limiting sense, as being applied to hot water heating systems only.

More in particular, this invention relates to control devices of the interceptor type in which a scoop-shaped interceptor member is employed to divert a portion of the flow in a main pipe into a branch connection. That is to say, at a branch point an interceptor member projects part way into the flow area in the main pipe, and the amount of fluid diverted depends upon the extent of that projection.

While some control devices of this kind are known in which the interceptor member is therefore adjustable, various drawbacks attach to them. Among such drawbacks is the fact that they require or are embodied in special pipe fittings or couplings, which makes them awkward to install, inspect, exchange, or remove, since that cannot be done without disconnecting the pipes themselves from the fitting. Their application is subject to limitations of use in new piping systems and cannot be used in existing piping systems without removing the greater part of the pipe lines and installing a new piping system.

It is among the objects of this invention to provide adjustable flow control devices of the interceptor type that are readily installable, removable, or inspectable, without necessitating the disconnection of the associated pipes themselves; to provide devices that will readily lend themselves to be installed in existing systems and even though the space conditions or limitations for the installation may vary widely at the various points of the system, and irrespective of the presence of existing older control means of the valve type in the system; to provide devices that are substantially foolproof and non-binding or sticking, that are inexpensive, that are readily accessible for adjustment, and in which the degree of adjustment is accurate and visible by outward indicating means; and in which the interceptor member offers a minimum obstruction to the main or original flow into which it more or less projects depending upon adjustment for the separate branches of various locations from the source.

These objects are attained by providing an interceptor member that is movable or adjustable along its longitudinal axis and into and out of the flow path in the main pipe. This includes the interceptor scoop itself and a stem unitary with the interceptor member and a stuffing box-nipple provided and coaxial with a branch neck extending at right angles from the main pipe. The interceptor member is operatively supported in and guided by the stuffing box-nipple as well as longitudinally adjustable therein. The scoop member is arranged to be non-binding or -clogging due to the provision of certain clearance relationships between that member and the surrounding inner walls of associate pipe portions or fittings. The mounting of the interceptor device is such that it can be withdrawn and removed bodily from the branch neck whereupon the neck can be closed by plug or cap without otherwise disturbing the pipe connections. An existing pipe system can thus be easily converted to the use of the kind of interceptor device such as is herein proposed.

According to one feature, the intercepting scoop member itself consists of a tubular body portion terminating at one end in an elbow, lip, or scoop portion. The stem is rigidly and coaxially connected with the scoop member in a manner to leave a substantially free-flow passage therethrough. This member is shiftable axially within a branch pipe connection and is thereby extendible or retractable at right angles with respect to the flow path in the main pipe. The tubular body portion is allowed to move clear of the surrounding inner walls of the branch pipe connection from which or into which it leads, so its only operative and guiding support is derived from the stuffing box-nipple.

According to another feature the stuffing box-nipple has associated with it means for the longitudinal fine adjustment of the interceptor member. More specifically, this is a differential screw fine adjustment comprising an annular differential screw member or fitting having inner and outer thread, its inner thread engaging the upper threaded end of the interceptor stem, and its outer thread engaging an inner thread provided in the top portion of the stuffing box-nipple.

Other features relate to the fact that the interceptor device is particularly well suited and adapted for installation or insertion in existing pipe systems. That is to say, one feature provides for an arrangement of fittings whereby the stem may be disposed to point co-directionally with the branch connection, while another feature allows for a mounting in which the stem points in a direction opposite to that of the branch connection.

According to one important mode of adaptation to which my flow control device lends itself, an existing pipe system can be readily converted to the use of my proposed interceptor device substantially without disturbing the existing pipe connections themselves. To this end an existing pipe may be tapped, that is a branch neck may be welded on to the existing pipe and the present interceptor device inserted therein and connected therewith.

It is possible to vary automatically the setting of the interceptor member and thereby maintain a desired flow distribution and desired temperature conditions in the branches of the system. This I attain by combining the above defined manually operable interceptor device with automatic temperature responsive control means capable of effecting a setting of the interceptor member in response to or in proportion to temperature changes occurring at a selected point of the system and automatically returning to the manual setting.

More specifically, an actuating device or head is mounted upon this stuffing box-nipple to automatically effect the axial shifting of the interceptor stem. Temperature responsive transmitting means contacting the fluid medium in the pipe system lead to the control head to furnish the actuating impulse therefor.

According to one feature, the control head comprises an annular impulse or force-transmitting member surrounding the upper end portion of the interceptor stem. That member may be in the form of an annular diaphragm construction or Sylphon bellows, or it may be in the shape of a solenoid coil, the movable core or plug for which is carried by and is coaxial with the interceptor stem. The Sylphon bellows may be controlled through means conventional of themselves, namely a temperature expansive medium confined in a so-called aquastat system, that is, through an aquastat bulb contacting the fluid medium in the pipe system and a communicating tube connecting the bulb with the Sylphon bellows. In the case of solenoid actuation, electric current for energizing the solenoid may be received for example through a bi-metallic temperature controlled switch or through a switch which is in turn controlled by aquastat conventional by themselves.

It is possible to have the control head in the nature of an optional attachment to the manually settable interceptor device as above defined.

It is also possible to have a control head, the component parts of which are alternatively mountable in variant ways with the result that the impulse of the stem direction may be optionally utilized to produce a shift of the interceptor member in the one or in the other direction, depending upon the local conditions and installation requirements in any particular instance. In other words, depending upon installation requirements, the control head may be utilized substantially without construction change, although the manner of assembly of its component parts will be altered to reverse the sense of operation.

The novel features considered characteristic of my invention are set forth with particularity in the appended claims. The invention itself, however, both as to its organization and its method of operation, together with additional objects and advantages thereof, will best be understood from the following description of a specific embodiment when read in connection with the accompanying drawings in which Figures 1, 2, 3, 4, 4ª, 5, 5ª, 5ᵇ, show embodiments of the manually operated flow control device.

Figures 6, 6ª, 7, 8, 8ª, 8ᵇ show embodiments of the automatically operated device, comprising actuating control means of the Sylphon-aquastat type.

The flow control device according to this invention is adaptable to a variety of local conditions or installation requirements such as may be encountered in existing pipe systems. Therefore, this device may take, for instance, the form shown in the embodiments of Figures 1 and 2 or such forms as shown in the embodiments of Figures 3 and 4. Figures 1 to 4, however, represent the basic principle of this invention as embodied in a manually adjustable device in which a flow directing or flow intercepting member is longitudinally or axially adjustable, that is, into and out of the path of flow in a pipe.

In Figure 1, a flow directing member 10 comprises a scoop portion 11 consisting of a tubular body portion 12, a lip portion 13, and a stem 14 extending rigidly from the lip portion 13 and coaxial with the tubular portion 12. The free end portion of the stem is provided with a thread 15 engaged by a nipple or adjusting nut 16 having outer thread 17 engaging the inner thread 18 of the crown portion 19 of the stuffing box housing member 20.

The stuffing box housing member 20 including its crown portion 19 in fact represents an elongated or tubular body portion 21 having a transverse partition 22 through which extends the stem 14. Thus, there are formed in the stuffing box housing member 20 an upper chamber or hollow 23 in which the adjusting nipple 16 may be screwed up or down, and a lower chamber or hollow 24 filled with a packing or graphited sealing material 25 compressed by a stuffing box-nipple or gland member 26 in the form of a nipple or packing stem 27 having a square portion 27ª between its one end portion that is screwed into the chamber 24 and the other end portion that is screwed into the interior thread of a reducing nipple 28 the outer thread of which is screwed into the neck 29 shown to be welded as at 29ª into a main pipe 30 in which the flow of the heat exchange fluid is indicated by an arrow 31. The stuffing box housing member 20 and the gland member 26 or stuffing box-nipple 27 constitute together what is herein termed the stuffing box S. The stem 14 is prevented from rotating in the nipple 27 but is allowed to be axially shiftable therein due to a key and groove—or spline connection 32.

Extending in a direction opposite to the neck 29 is a branch pipe 33 welded as at 33ª into the main pipe 30. The scoop portion 11 of the flow directing member 10 lodges within the initial portion of the branch pipe 33, there being provided a wall clearance 34 between the scoop portion 11 and the surrounding interior surface of the branch pipe 33. In view of this clearance the flow directing member 10 derives its sole support as well as longitudinal stabilization or guidance by reason of the stem 14 being mounted in the stuffing box S, or else by being mounted in a combination of this stuffing box with such stem adjusting means as the adjusting nut 16. The longitudinal or axial adjustment of the flow directing member 10 may be effected with the aid of mechanical but manually actuated adjusting means such as the nipple 16 or such adjusting means may be omitted and the stem 14 may be shifted by manipulating it directly as indicated in the embodiment in Figure 2.

In the construction shown in Figure 1, the rotation by hand or by hand wrench of the adjusting nut or nipple 16 while the stuffing box-nipple member remains stationary, will effect the axial shift of the stem 14 in the stuffing box-nipple at a rate which depends upon the manner or ratio of threading as provided between the stem 14 and the nipple 16 on the one hand, and between the nipple 16 and the stuffing box member 20 on the other hand. Thus, by depending upon the kind and ratio of these two threads, there may be effected a ratio increasing or a ratio decreasing shifting movement of the stem 14 as a result of the rotation of the nipple 16. Such adjustment will move the scoop portion 11 either into or out of the path of the fluid in the main pipe 30, and by shifting that portion far enough into the branch pipe 33, it may be fully removed from the flow area in the main pipe and thus rendered largely ineffective as a flow directing or flow intercepting means. Yet, due to the wall clearance 34 between the scoop portion and the surrounding branch pipe a small flow therethrough of the fluid may still be allowed to continue between the main pipe 30 and the branch pipe 33 with the result that this clearance is kept uncongested by solids or scales.

The Figure 1 example further indicates a mode of installing the device of this invention into or adopting it to an existing pipe system without the necessity of disturbing or disconnecting the existing main pipe on which the device is to be installed. Dot-and-dash lines 35 and 35a respectively indicate that portions of the main pipe 30 may be cut out to provide openings in the pipe wall which can then be built up into welded connections 29a and 33a respectively of the neck 29 and of the branch pipe 33 respectively with the main pipe 30.

Except for some structural variations the device in Figure 2 embodies the same basic principle of function as that in Figure 1, using a cap member or packing box nut 36 instead of the stuffing box member 20 of Figure 1 and allowing the free end of the stem 14a to protrude from that cap member. A flow directing member 10a otherwise is the same as the flow directing member 10 in Figure 1. Gland member and stuffing box-nipple 26a, 27a and a reducing nipple 28a are the same as corresponding parts 26, 27 and 28 in Figure 1. However, the Figure 2 embodiment substitutes a pipe cross fitting 37 instead of the welded pipe connection shown in Figure 1 and consequently shows threaded connections between that fitting and portions 38 and 39 of a main pipe, and threaded connections 37' and 37" with pipe portions 38 and 39 respectively, and a threaded connection 37''' with a branch pipe 33b. Another threaded connection 40 is between the neck 41 of the cross fitting 37 and the reducing nipple 28a. Figure 1 can be built into threaded pipe fittings as shown in Figure 2 and Figure 2 can be built into welded branches as shown in Figure 1. The embodiment in Figure 3 takes care of installation requirements that are different from those that would constitute the environment of the embodiment of Figures 1 and 2. From a main pipe 44 extends a neck or branch connection 45 welded into the pipe as at 46. A T-pipe fitting 47 having a vertical body portion or straight portion 48 and a lateral branch or neck portion 49 is fastened by way of thread connection 50 upon the neck 45. A branch pipe 51 has a thread connection 52 with the fitting 47 by way of the neck portion 49 thereof. A longitudinally adjustable flow directing or flow intercepting member 53 has a scoop portion 54 consisting of a tubular body portion 55 and a lip portion 56. A stem 57 is coaxial with the tubular body portion 55 and fastened thereto in a manner more clearly shown in the detail Figures 4a, 5a and 5b. The scoop portion 54 is shown to lodge in, and to be withdrawable into the neck 45 of the branch connection, while the stem 57 extends through the straight portion 48 of the fitting 47 and through the gland member or nipple 58 connected with the fitting 47 through a reducing nipple 59, and further extends through a stuffing box member 60 shown to be provided with stem adjusting means in the form of an adjusting nut or nipple 61. The parts 59, 58, 60 and 61 in Figure 3 correspond to similar parts 28, 27, 20, 16 in Fig. 1. Similarly, also, the stem 57 is non-rotatable although longitudinally shiftable in the gland member 58 because of a key and groove or spline connection 58a. The scoop portion 54 can be rendered ineffective as a flow directing means by withdrawing it into the neck 45 of the branch connection, such withdrawn position being shown in dot and dash lines in Fig. 3. There is also noticeable in this figure as in Figure 1, a wall clearance 54a between the scoop portion 54 and the surrounding neck 45.

Figure 4 shows a T-pipe fitting 62 substituted for the welded connection 46 of Figure 3, and further shows a neck portion 63 having threaded connection 64 with the pipe fitting 62, and also showing main pipe portions 65 and 66 having threaded connections 67 and 68 with the pipe fitting 62.

Figure 5 illustrates an important feature inherent in the structural organization of this device, according to which the flow directing device including the flow directing axially shiftable member can be bodily lifted and withdrawn from its mounting on the main pipe without necessitating the disturbance or dismounting of any pipe connections. Referring to the Figure 3 embodiment, this means that neither the main pipe 44 nor the branch pipe 51 need be disturbed.

Figures 6 to 8 show embodiments of the control device with the addition of automatic actuating means therefor. They also indicate how the manually operated devices of Figures 1 to 5 can be converted to automatic operation, namely, by way of attachment of a control head for actuating the shiftable flow directing member of the device. For this purpose, the control head may comprise a Sylphon (see Figures 6, 7) to act as the force-imparting member for the axial shifting of the flow directing member, the Sylphon in turn being operated through temperature responsive aquastat system.

Referring to Figure 6, the attachment of a control head H is effected by mounting it upon the stuffing box, namely, upon a closure cap 69 which covers the stuffing box member or gland member or nipple 70, confining therein the sealing material or packing 71, if desired, with the aid of a packing ring 72. The nipple 70 is screwed into a reducing nipple 73 which in turn has threading engagement with a neck 74 shown to be welded as at 75 into a main pipe 76. Extending in a direction opposite to the neck 74 is a neck 77 having threaded connection with a branch pipe 78 in which lodges the scoop portion 79 having fixed thereto a stem 80 to constitute a longitudinally or axially shiftable flow directing member 81. The scoop portion 79 comprises a tubular body portion 82 and a lip portion 83 to which the stem 80 is fixed so as to be coaxial with the tubular body portion 82. A clearance 84 is provided between the scoop portion 79 and the surrounding branch pipe 78. With the thread 85 provided at the free end portion of the stem 80, the flow directing member 81 itself is similar to the flow directing member 10 in Figure 1, or the flow directing member 10ª in Figure 2, but its operative engagement with the control elements of the control head H is effected through a nut 86 subject to the pressure of a spring 87 coiled around the stem 80 and confined between the nut 86 and the screw cap member 69. In addition, the control head H comprises an annular shaped Sylphon 88 through which extends the stem 80. The bottom 89 of the Sylphon is engaged by the nut 86, while the top 90 of the Sylphon engages a bracket 91 fastened by screws 92 to the inside of the top portion of an inverted housing shell 93 composed of two halves 93ª and 93ᵇ (see also Fig. 8ª) and mounted on a base portion 94 by means of bayonet slot and screw connection 95 (see also detail Fig. 6ª).

The base portion 94 has a downwardly extending neck 96 whereby it is fitted over the screw cap member 69 and fastened thereto as by a set screw 97.

The Sylphon 88 constitutes a part of a so-called aquastat system in that the interior of the Sylphon has a communicating tube connection 98 leading to an aquastat bulb 99 and forming therewith a closed system in which a temperature responsive fluid is confined. A temperature change affecting the bulb 99 will cause the fluid in the system to either expand or contract respectively as the case may be. Accordingly, the Sylphon 88 will either expand against the pressure of spring 87 and to the extent of that expansion shift the stem 80 downward and out of the path of the fluid in main pipe 76, or else the Sylphon will contract allowing the pressure of spring 87 to shift the stem 80 in the opposite direction, namely upward, thereby advancing the scoop portion 79 and more specifically the lip portion 83 thereof into the path of the liquid flowing through the main pipe 76. The bulb 99 contacts a heat exchange fluid in a pipe 100 which is part of the pipe system. The bulb is mounted on the pipe 100 through a neck 101 welded as at 102 on pipe 100 and a nipple or cap 103 engaging the neck.

A tubular portion 104 is fixed to and unitary with the nut 86 (see also Fig. 8ª) and surrounds the free end of the stem 80 and moreover extends through the Sylphon 88, the bracket 91, as well as through the top of the housing shell 93. Thus a portion 105 of the tubular portion 104 is shown to be projecting upwardly from and out of the housing shell 93, the protruding portion serving as a means of manipulating and rotating the nut 86 manually from the outside in order to effect longitudinal positioning adjustment of the stem 80. In this way, one can adjust the range of shift of the flow directing member 81 to be effected by the automatic control head H relative to the flow area in the pipe 76.

Figure 7 shows the device of Figure 6 with certain parts drawn apart to illustrate the manner of attaching the control head H. In regard to this embodiment it shows how after loosening the set screw 97 the housing portion of the head, that is the base portion 94 and the shell portion 93 together with the Sylphon 88 can be slipped off the screw cap member 69, while the spring 87 and the nut 86 with its tubular portion 104 remain in place.

Figure 8 shows how the Figure 3 embodiment of the manually operated flow control device can be converted into an automatically operated unit. There is a main pipe 106 having a neck 107 welded thereto as at 108, a T-pipe fitting 109 has a body portion or straight portion 110 and a lateral neck portion 111. At one end of the straight portion 110 this fitting has a threaded connection 112 with the neck 107, and the neck portion 111 of the fitting has a threaded connection 113 with a branch pipe 114. The opposite end of the straight portion 110 has a threaded connection 115 with a reducing nipple 116 into which is screwed a gland member or nipple 117 having key and groove or splined connection 118 with a stem 119 which is fixed to a scoop member 120, the stem 119 and the scoop member 120 constituting a flow directing member 121 that is longitudinally or axially shiftable in the nipple 117. The nipple 117 has a packing of sealing material 122 confined in it by a sealing ring 123 and a closing cap member 124.

A control head H' has a base portion 125 fitted over and fastened to the cap member 124 by means of a set screw 126. An inverted housing shell 127 is fastened to the base portion 125 by means of screws 128. A bracket 129 is mounted in the lower portion of the housing shell 127 by means of screws 130. An annular shaped Sylphon 131 rests upon the bracket surrounding the stem 119, the top 132 of the Sylphon engaging a nut 133 which in turn engages threads provided upon the outer end portion 134 of the stem 119. This nut 133 is under the pressure of a spring 135 confined between the nut 133 and the top portion 136 of the housing shell 127. Fixed to and unitary with the nut 133 is a tubular portion 137 surrounding the extreme end portion of the stem 119 and in turn being surrounded by the coiled spring 135. The tubular portion 137 extends through and beyond the top portion 136 of the housing shell, thus presenting a protruding portion 138 whereby the nut 133 can be rotated on the stem 119 for effecting a longitudinal positioning adjustment of the flow directing member 121. Thus one can adjust the range of operating movement of the flow directing member 121 relative to the flow area in the pipe 106, as it is to be effected by the operating head H'. The Sylphon 131 has a communicating tube connection 139 with a bulb 140 with which it constitutes a temperature responsive so-called aquastat system in which a temperature responsive fluid is confined. The bulb 140 is affected by temperature changes of a fluid passing through a pipe 141, and it is mounted on the pipe 141 through a neck 142 welded thereto as at 143, and through a nipple or screw cap 144 having thread connection with the neck 142. Thus a rise in temperature of the fluid passing through pipe 141 will cause the Sylphon 131 to expand and accordingly to shift the stem 119 upwardly against the pressure of the spring 135. A drop in temperature will cause contraction of the Sylphon and allow the stem 119 to be shifted in the opposite direction by the pressure of the spring 135.

Comparing the embodiment of the Sylphon actuated type of Figure 6 and Figure 8 with one another, it will be noted that while each meets a different installation requirement in the pipe system, the control head H of Fig. 6 will assume the appearance of the control head H' of Fig. 8 merely by a change in the mounting or by the reversal of parts within the control head. That is to say, the bracket 91 of Fig. 6 is reversed and mounted as in Figure 8 where it appears as bracket 129. The Sylphon 88 of Figure 6 also is reversed from its depending position so that it appears upright as Sylphon 131 on its bracket 129 in Figure 8. Correspondingly, the communicating tube 98 entering through the top of housing shell 93 in Figure 6 appears as the tube 139 in Figure 8 entering through the lower portion of the housing shell 127. Consequently, the spring 87 in Figure 6 disposed underneath the Sylphon 88 and within the lower portion of the housing shell appears in Figure 8 as spring 135 above the Sylphon 131 and within the upper portion of the housing shell 127.

I claim:

1. In a heat exchange pipe system carrying heat exchange fluid and having a main fluid conveying pipe, a sleeve adapted for use as a branch to said pipe, a length of pipe telescoping within said sleeve and having one end open and its other end closed, said pipe having an opening in its side wall adjacent said closed end to form a scoop, said length of pipe having its one open end facing away from said main pipe, and means for moving said length of pipe between two extreme positions, said pipe length having one extreme position where the scoop portion extends into the main pipe and faces the fluid stream for diverting fluid into said branch, said pipe length having another extreme position wherein said scoop portion is telescoped into said sleeve.

2. The structure of claim 1 wherein said pipe length and sleeve are so dimensioned as to provide a free annular space between the outside of said pipe length and opposed inside surface of said sleeve and wherein means are provided for supporting said pipe length in said sleeve to maintain said annular space.

3. The structure of claim 1 wherein said moving means includes a rod rigidly attached to said length of pipe, said rod being disposed along the line of movement of said pipe length, and packing means carried by said pipe system through which said rod passes to the exterior of said pipe system.

4. The structure of claim 1 wherein said pipe length and sleeve are so dimensioned as to provide a free annular space between the outside of said pipe length and opposed inside surface of said sleeve and wherein said moving means comprises a rod rigidly attached to said length of pipe and extending longitudinally thereof, an elongated packing journal carried by said pipe system through which said rod passes from the interior of said pipe system to the exterior thereof, said journal being long enough so that said pipe length may be supported substantially symmetrically within said sleeve.

5. A valve for use in a heat exchange pipe system carrying heat exchange fluid, said valve comprising a branch to said fluid conveying pipe and a valve member disposed within said branch and movable axially of said branch, said valve member comprising a length of pipe having one end closed and the other end open and having an opening in its side wall adjacent the closed end to form a scoop, said length of pipe being disposed within said branch so that said open end faces away from the main fluid conveying pipe, means for moving said length axially of said branch from one extreme position where the scoop portion extends into said pipe to another extreme position wherein said scoop is telescoped into said branch, and means for restraining said movable pipe length against rotary movement with said scoop portion facing the normal fluid flow in said main pipe in its one extreme position.

6. A valve member for use in a heat exchange pipe system, said valve member comprising a length of pipe having one end open and the other end closed and having an opening in its side wall adjacent said other end to form a scoop and guide means attached to said pipe length adapted to impart longitudinal movement to said valve member while retaining the same locked against rotary movement.

7. In a heat exchange pipe system carrying a heat exchange fluid and having a main fluid conveying pipe, a T section in said main pipe, the two alined ends of said T being in the main fluid stream, a length of pipe within said third T end, said length having one end open and the other end closed with the open end facing away from the T and said length of pipe having an opening in its side wall adjacent the closed end to form a scoop, means for moving said pipe length over a range having two extreme positions, one extreme position being where the scoop portion is in the T head in the main fluid stream and the other extreme position being where said scoop portion is telescoped into the third T end, and means for locking said pipe length against rotation in a position where the scoop portion faces the fluid stream when diverting fluid.

WILLIAM LOUIS HAND.